United States Patent [19]
Taku

[11] Patent Number: 5,960,223
[45] Date of Patent: Sep. 28, 1999

[54] IMAGING FIELD CHANGING APPARATUS

[75] Inventor: Masakazu Taku, Yokohama, Japan

[73] Assignee: Canon Kabushiki Kaisha, Tokyo, Japan

[21] Appl. No.: 08/922,391

[22] Filed: Sep. 3, 1997

Related U.S. Application Data

[63] Continuation of application No. 08/568,524, Dec. 7, 1995, abandoned, which is a continuation of application No. 08/202,226, Feb. 25, 1994, abandoned.

[30] Foreign Application Priority Data

Feb. 26, 1993 [JP] Japan ................................. 5-061231

[51] Int. Cl.[6] .................................................. G03B 17/02
[52] U.S. Cl. .......................................... 396/435; 396/436
[58] Field of Search ....................... 352/79, 80; 396/435, 396/436

[56] References Cited

U.S. PATENT DOCUMENTS

| Re. 32,797 | 12/1988 | Harvey | 354/431 |
|---|---|---|---|
| 4,583,831 | 4/1986 | Harvey | 354/106 |
| 4,639,111 | 1/1987 | Harvey | 354/431 |
| 5,049,908 | 9/1991 | Murakami | 354/159 |
| 5,066,971 | 11/1991 | Kodaira | 354/465 |
| 5,086,311 | 2/1992 | Naka et al. | 354/195.1 |
| 5,298,929 | 3/1994 | Tsunefuji et al. | 354/159 |
| 5,361,108 | 11/1994 | Kamata et al. | 354/120 |
| 5,382,508 | 1/1995 | Ikenoue | 354/159 |
| 5,493,356 | 2/1996 | Tokui | 354/159 |

*Primary Examiner*—Howard B. Blankenship
*Assistant Examiner*—Nicholas J. Tuccillo
*Attorney, Agent, or Firm*—Fitzpatrick, Cella, Harper & Scinto

[57] ABSTRACT

In an imaging field changing apparatus capable of changing three or more imaging fields having different aspect ratios, a changing order can be set such that one of two imaging fields having largest rate of change in aspect ratios during imaging field changing is changed to the other of the two imaging fields. The imaging fields are exemplified as a standard size, a panorama size, and a high-vision size. Aspect ratio changing is performed such that the standard size is changed to the panorama size. A change in imaging field can be easily recognized. For example, when a change is to be made between the standard size and the panorama size, the upper and lower portions are cut or trimmed and the right and left portions are widened to emphasize wideness.

24 Claims, 7 Drawing Sheets

IMAGING FIELD CHANGING APPARATUS

This application is a continuation of application Ser. No. 08/568,524 filed Dec. 7. 1995, which is a continuation of application Ser. No. 08/202,226 filed Feb. 25, 1994, both now abandoned.

BACKGROUND OF THE INVENTION

1. Field of the Invention

The present invention relates to an imaging field changing apparatus, used in a camera, an optical equipment, or the like, for changing an imaging field such as a photographic imaging field or a finder imaging field.

2. Related Backaround Art

In the following description, L, H, and P stand for a standard size, a high-vision size, and a panorama size, respectively. In a conventional camera, the upper and lower portions of an L imaging field are cut to obtain a P imaging field in both an exposure area and a finder imaging field upon changing the size between L and P. For this reason, to obtain a panorama zoom-up effect in the finder imaging field or the like, a finder objective lens must be zoomed in only the panorama mode to increase the finder magnification, resulting in an expensive arrangement. In addition, the lens in the finder 2 optical system becomes bulky due to the increase in finder magnification.

As described above, in a conventional arrangement, to increase the finder magnification, the prism and the optical system become bulky resulting in a large camera. The objective lens and the like are driven to perform a zoom-up operation, which require a large number of complicated components such as a lens driving means, thus resulting in high cost. In addition, the diopter also changes upon movement of the objective lens, resulting in poor observation.

SUMMARY OF THE INVENTION

The present invention has been made to solve the conventional problems described above, and has as its object to provide an imaging field changing apparatus capable of increasing width upon a change in imaging field.

According to one aspect of the invention, there is provided an imaging field changing apparatus comprising imaging field changing means for performing a change among at least three imaging fields having different aspect ratios, each of which is defined as a ratio of a vertical length to a lateral length of an imaging field, and changing order determining means for performing a change to one of two imaging fields having largest rates of changes in the aspect ratios upon the change among at least three imaging fields, and then performing a change to the other of the two imaging fields.

According to one aspect of the invention, there is provided a photographic area changing apparatus comprising photographic area changing means for performing a change among at least a first, a second and a third photographic area, and changing order determining means for changing the first photographic area into the second photographic area. A rate of change in the photographic area upon the change between the first photographic area and the second photographic area is larger than a rate of change in the photographic area upon the change between the first photographic area and the third photographic area and is larger than a rate of change in the photographic area upon the change between the second photographic area and the third photographic area.

DETAILED DESCRIPTION OF THE PREFERRED EMBODIMENTS

First Embodiment

Figures 1A, 1B:
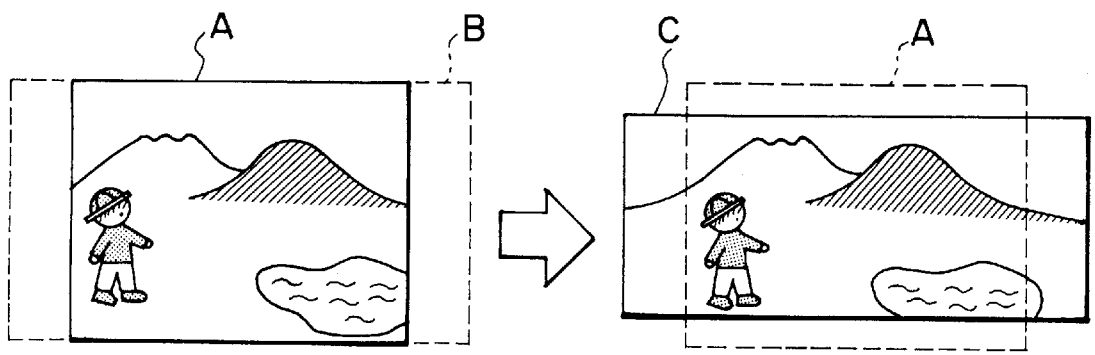
FIGS. 1A and 1B are views for explaining imaging field changing in an imaging field changing apparatus according to the first embodiment of the present invention.

FIGS. 1A and 1B are views showing states of imaging field changing in an imaging field changing apparatus according to the first embodiment of the present invention. An imaging field is changed to an L imaging field A or a P imaging field C to cut the upper and lower fields and widen the right and left fields, thereby obtaining increased width. The print size in a P imaging field print is twice that in a normal L imaging field print. In proportion to this, the finder imaging field is increased to increase the print result, thereby also creating a greater impression.

Figures 2A, 2B:
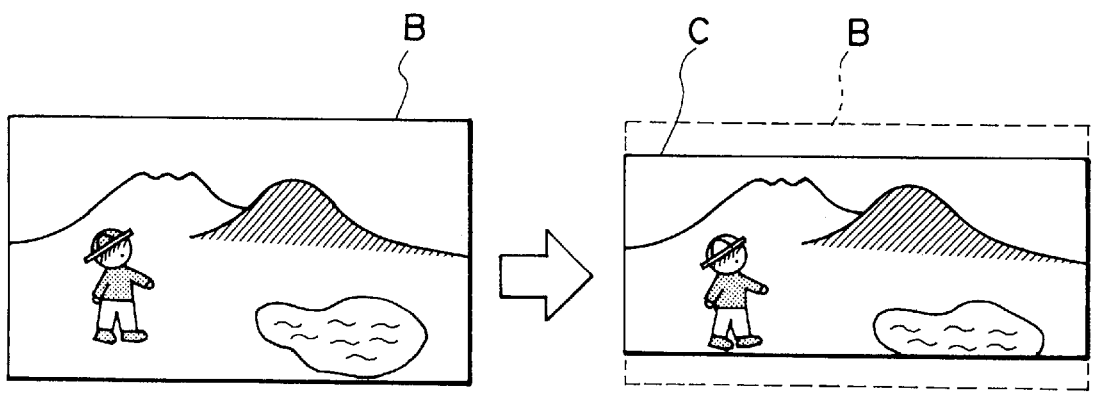
FIGS. 2A and 2B are views for explaining imaging field changing in a conventional imaging field changing apparatus.

FIGS. 2A and 2B show a conventional example. When the H imaging field having a range B is changed to a P imaging field having a range C, only the upper and lower portions are cut, thus failing to increase width. In addition, wideness proportional to an increase in print size cannot be obtained.

Figure 3:
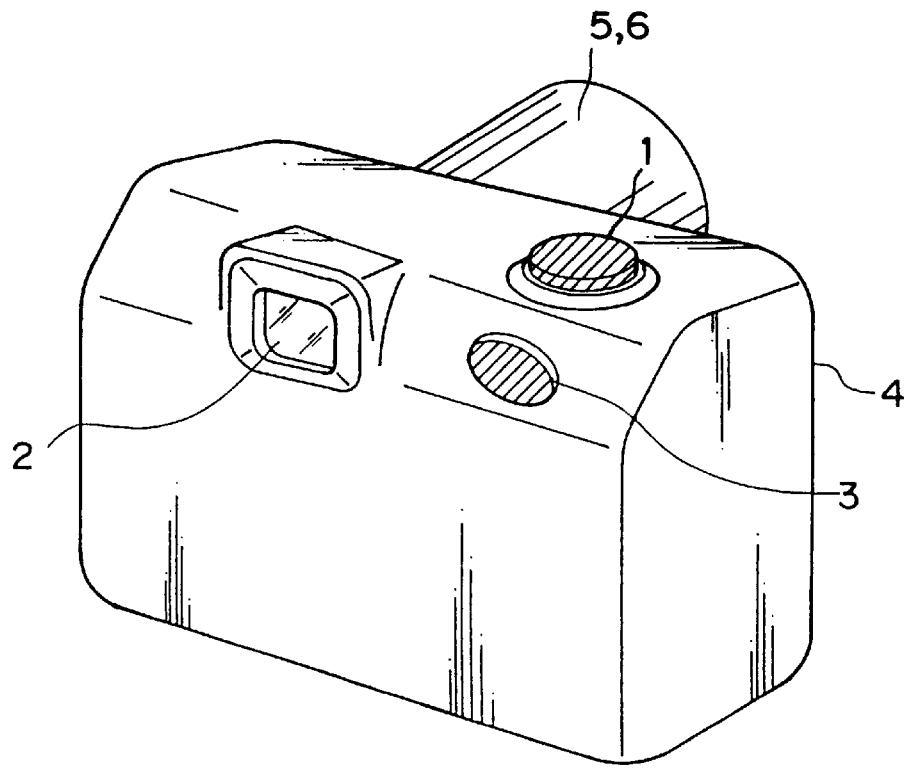
FIG. 3 is a perspective view of a camera having the imaging field changing apparatus of the first embodiment of the present invention.

FIG. 3 is a perspective view showing the outer appearance of a camera having the imaging field changing apparatus according to the first embodiment of the present invention. Imaging field changing is performed in the following order: that a user holds a camera body 4 with his hands, depresses the push switch of an imaging field changing switch 3 while observing the camera finder, determines framing, and depresses a release button 1 to take a picture. In the camera shown in FIG. 3, the imaging field changing apparatus is arranged to change a real-image finder imaging field.

Figure 4:
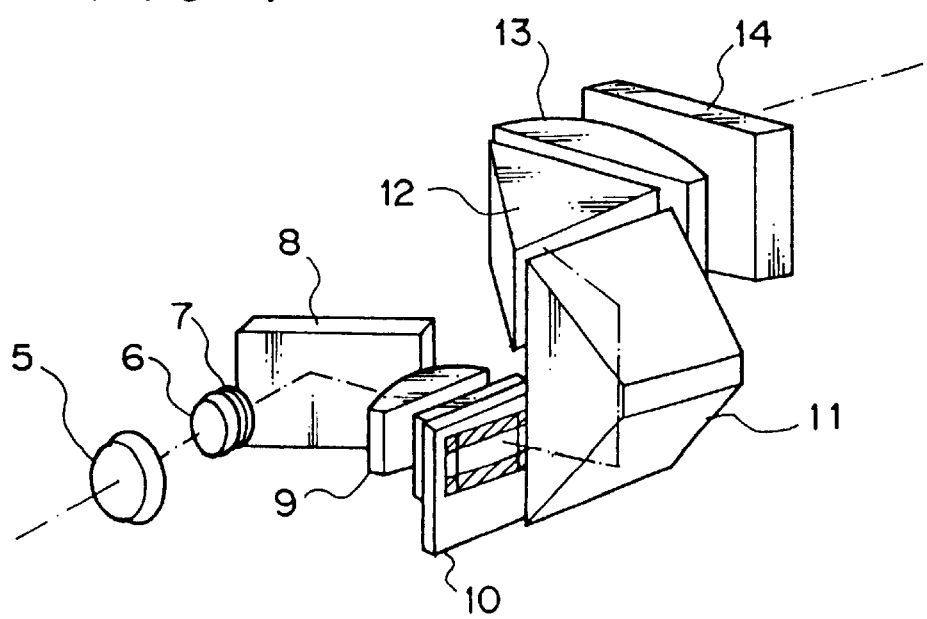
FIG. 4 is a perspective view showing the structure of a finder of the camera shown in FIG. 3.

FIG. 4 is a perspective view showing the layout of the imaging field changing apparatus of this embodiment in the camera shown in FIG. 3. Referring to FIG. 4, this optical system includes objective lenses 5, 6, and 7, a reflecting mirror 8, a field lens 9, a TN type imaging field changing LCD 10 for performing imaging field changing, optical prisms 11 and 12 for obtaining an erecting image, an eyepiece 13, and an eyepiece protective glass plate 14. In the arrangement of FIG. 4, when the imaging field changing switch 3 is depressed, the display state of the imaging field changing LCD 10 changes in an order of sizes L→P→H→L in the finder 2.

Figure 5:
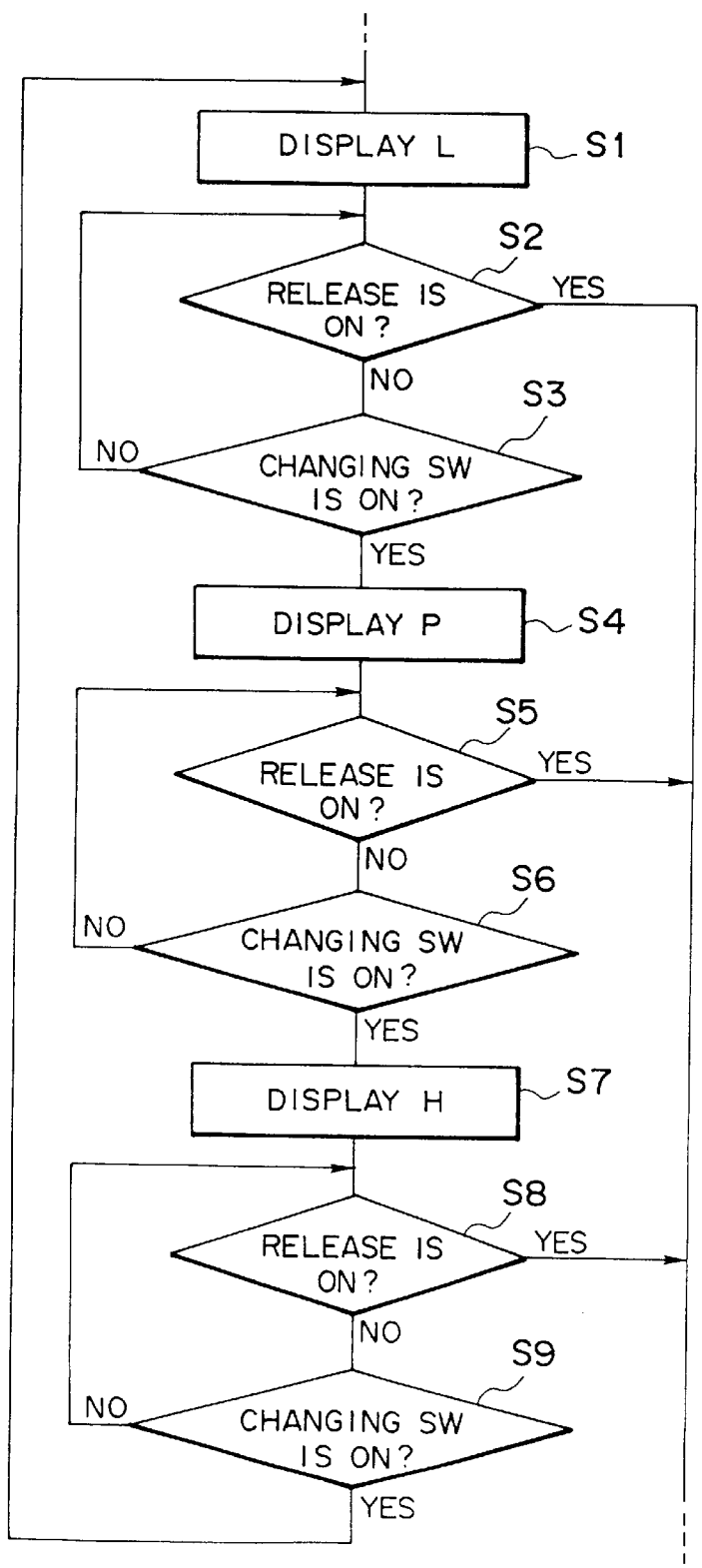
FIG. 5 is a flow chart showing the operation of the imaging field changing apparatus of the first embodiment.

FIG. 5 shows a camera sequence executed upon depression of the changing switch 3 in a change sequence of L→P→H→L. Each step in FIG. 5 is represented by S. Referring to FIG. 5, when a main switch (not shown) of the camera is depressed, the camera is set in a photographic standby state. The LCD 10 in the finder 2 displays an L display forming an L imaging field (S1). When the release button 1 is depressed, the flow advances to step S2, "RELEASE IS ON? yes", so that normal photography is performed. At this time, when the changing switch 3 is depressed without depressing the release switch 1, the flow advances to step S3 "CHANGING SWITCH IS ON? YES", so that the display of the LCD 10 changes from the L display to a P display forming a P imaging field (S4), thereby completing the preparation for photography in the P imaging field. In this state, when the release switch 1 is depressed, "RELEASE IS ON? YES" is obtained (S5), so that photography in the P imaging field is performed as in the L imaging field. When the changing switch 3 is depressed again without depressing the release switch 1, "CHANGING SWITCH IS ON? YES" is obtained in step S6, so that the display of the LCD 10 changes from the P display to an H display forming an H imaging field (S7). At this time, when the release switch 1 is depressed (S8), photography in the H imaging field is performed. If the changing switch 3 is depressed without depressing the release switch 1 (S9), the display of the LCD 10 changes from the H display to the L display. In this state, when the main switch is depressed, the same state as in the photographic standby state of the camera can be obtained. Every time the changing switch 3 is depressed without depressing the release switch 1, the display of the LCD 10 changes in an order of the L display, the P display, the H display, and L display such that the P display always appears after the L display. Therefore, the P imaging field as the panorama imaging field can be informed to the user such that a picture can be taken in a wide field.

Second Embodiment

Figure 6:
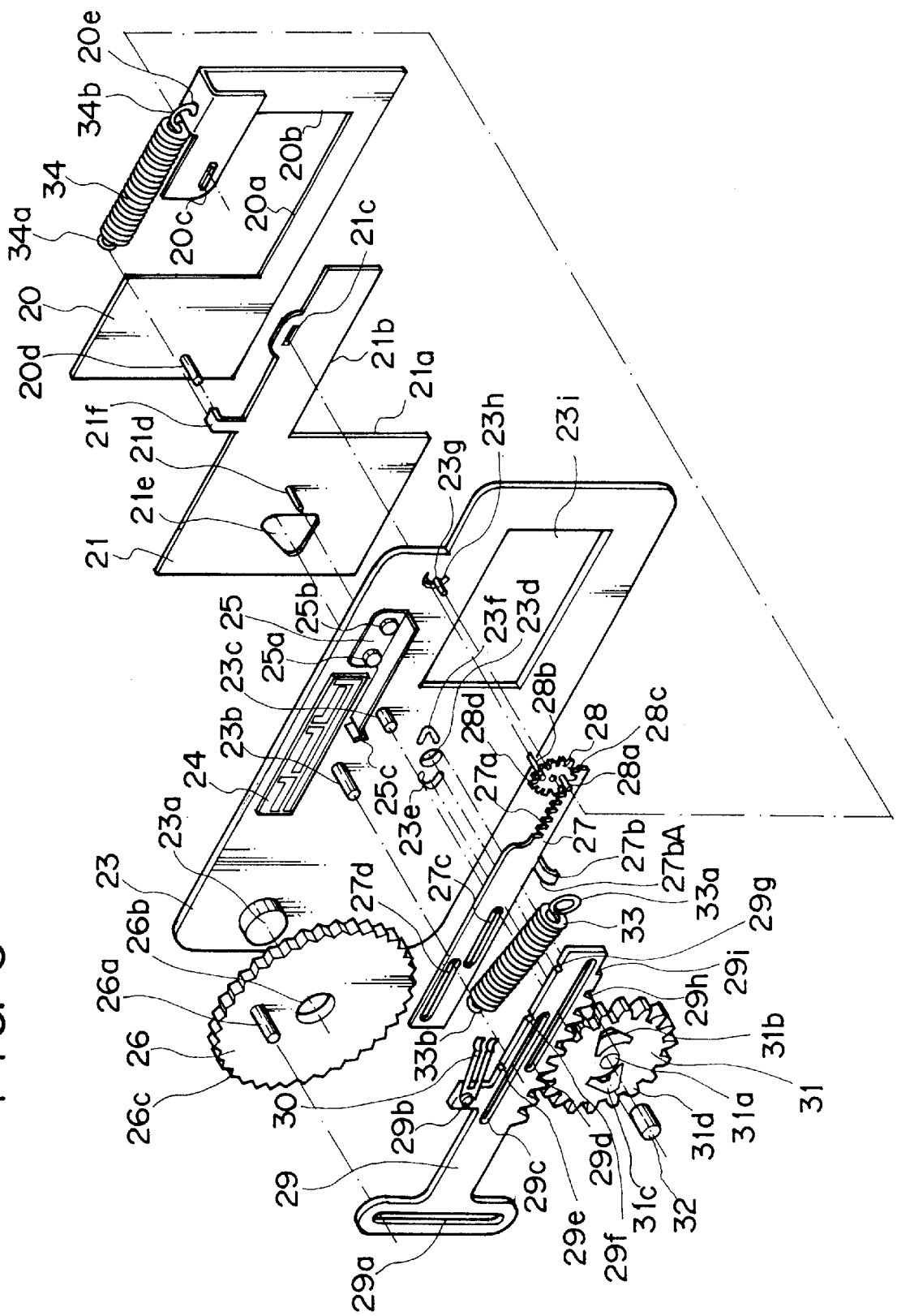
FIG. 6 is a perspective view showing the internal structure of an imaging field changing apparatus according to the second embodiment of the present invention.

FIGS. 6 to 9 show the imaging field changing mechanism according to the second embodiment of the present invention. In this embodiment, imaging field changing is performed not using an optical system but using a mechanical structure. FIG. 6 is a perspective view showing the mechanical structure. An opening 23i of a base plate 23 corresponds to the aperture of the LCD 10 on the focusing screen in the finder optical system, as shown in FIG. 4. Blades 20 and 21 in FIGS. 6 to 9 serve as light-shielding members for changing the opening 23i and have pins 20d and 21d. The pins 20d and 21d are fitted with cam portions 23e and 23f of the base plate 23. The blades 20 and 21 are moved by cam portions 31b and 31c of a gear 31 during rotation of the gear 31.

Pins 28a and 28b extending on the front and rear surfaces of a gear 28 rotatably supported on a shaft 23g of the base plate 23 are fitted with elongated holes 20c and 21c of the blades 20 and 21 to constitute second positioning mechanisms of the blades 20 and 21. The gear 31 is supported to be rotated such that a rotating shaft 32 is inserted into a hole 23d of the base plate 23 under pressure and fitted with the hole of the gear 31. The gear 31 is meshed with a rack 29h of a slide lever 29. When a dial 26 rotatably supported by the shaft 23a of the base plate 23 rotates, the slide lever 29 can be slid upon engagement between a pin 26a and an elongated hole 29a of the slide lever 29. The slide lever 29 has elongated holes 29c and 29d in which pins 23b and 23c of the base plate 23 are fitted. A driven lever 27 is also engaged with the pins 23b and 23c. A hook portion 33a of a spring 33 is hooked to a hook 27b of the driven lever 27. The other hook portion 33b is hooked to the base plate 23, so that the driven lever 27 is always biased to the left with respect to the base plate 23. An end portion 27bA of the hook 27b of the driven lever 27 abuts against a lock portion 29i of the slide lever 29. Click notches 29e, 29f, and 29g are formed in the slide lever 29 and stopped at respective positions by a click spring 25 fixed to the base plate 23 by pins 25a and 25b. The slide lever 29 has a contact piece 30 fixed by a pin 29b, and the contact piece 30 travels in slidable contact with the pattern on a board 24 fixed on the base plate 23, so that an electrical signal corresponding to each click position can be output. The blades 20 and 21 have spring hook portions 20e and 21f and are biased to draw close to each other by a spring 34 hooked therebetween. The blades 20 and 21 are pressed against L position portions 23eC and 23fC of the cam portions 23e and 23f in FIG. 7. The driven lever 27 has a rack gear 27a which is meshed with a gear surface 28d of the gear 28.

Figure 7:
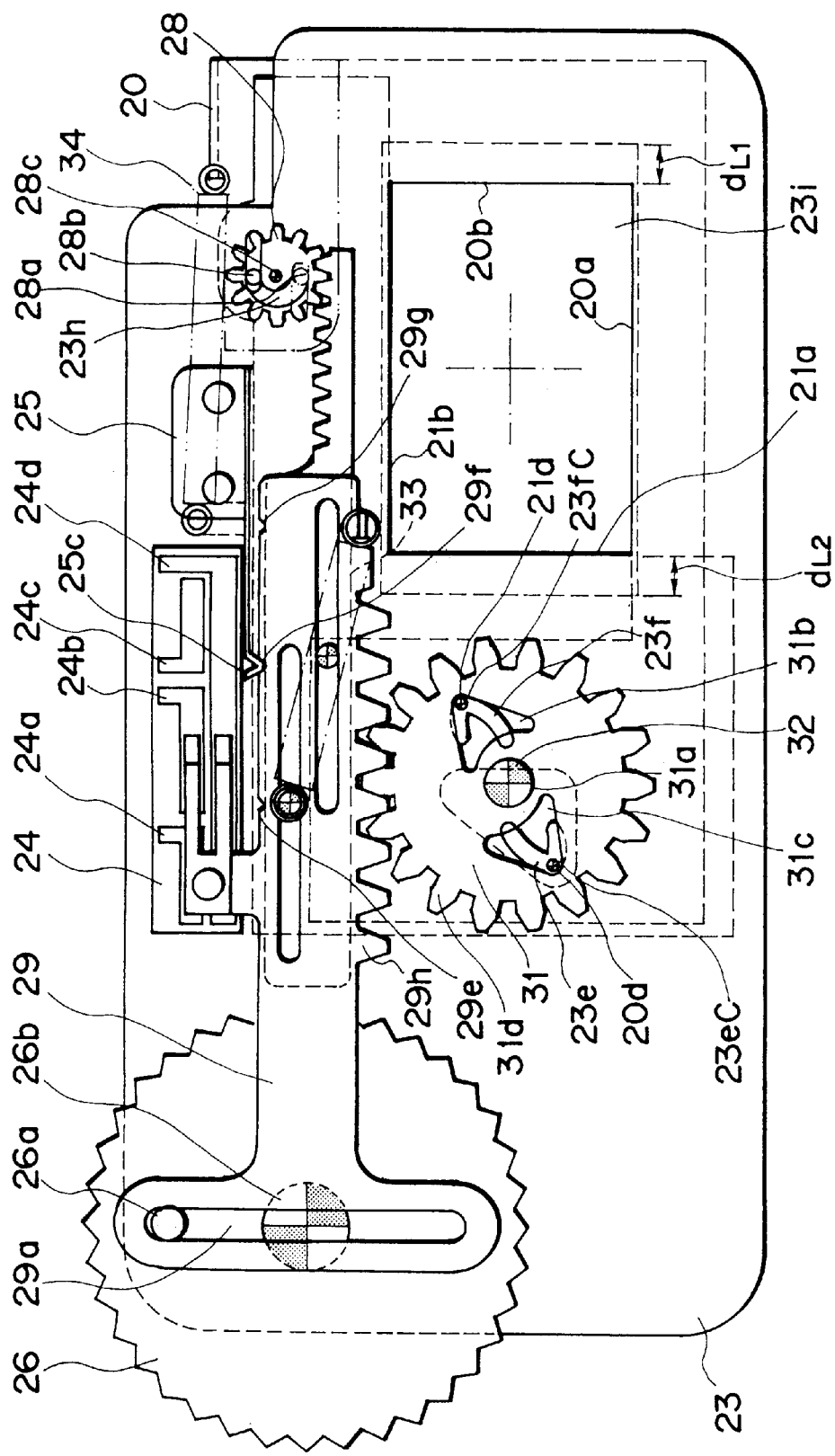
FIG. 7 is a plan view showing the internal structure of an imaging field changing apparatus according to the second embodiment of the present invention.

FIG. 7 shows a state of the L imaging field in the structure shown in FIG. 6. A click portion 25c of the click spring 25 is fitted in the notch 29f of the slide lever 29, and the gear 31 is set in the state of FIG. 7 by the rack 29h of the slide lever 29. At this time, the blade 20 is biased to the left by the spring 34, while the pin 20d is disengaged from the cam portion 31c of the gear 31 and pressed against the L position portion 23eC of the cam portion 23e of the base plate 23. In this state, an edge portion 20b is located to the left edge of the opening 23i serving as the aperture of the finder portion to shield the opening 23i by a width $d_{L1}$. Similarly, the blade 21 is biased to the right by the spring 34, so that the pin 21d is separated from the cam portion 31b of the gear 31. The blade 21 is pressed against an L position portion 23fC of the cam portion 23f of the base plate 23. An edge portion 21a of the blade 21 shields a left part of the opening 23i by a width $d_{L2}$. As a result, both sides of the opening 23i are shielded by the widths $d_{L1}$ and $d_{L2}$ to form an L imaging field.

Figure 8:
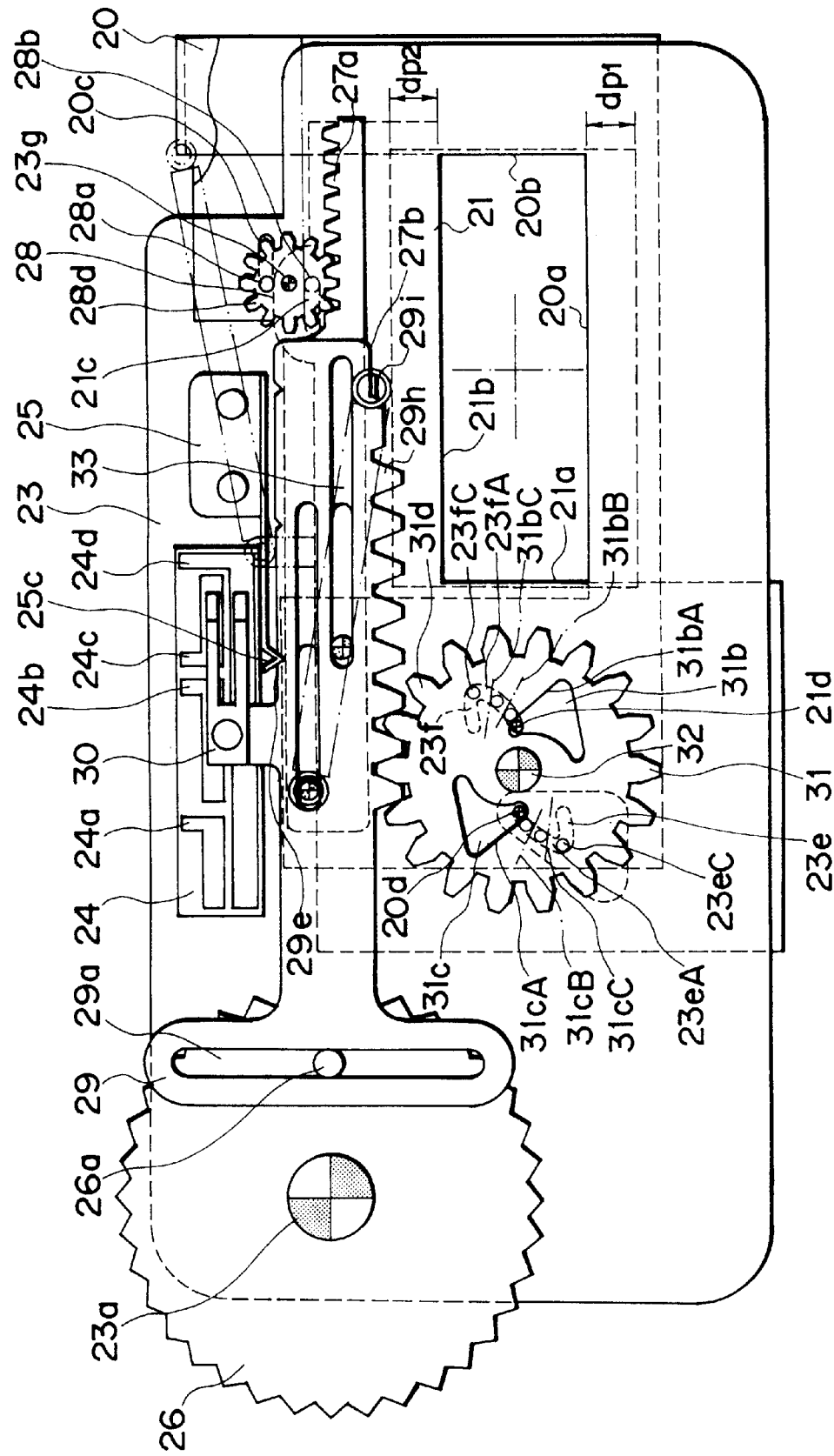
FIG. 8 is a plan view showing the internal structure of the imaging field changing apparatus according to the second embodiment of the present invention.

FIG. 8 shows a state of the P imaging field. In the state shown in FIG. 7, when the dial 26 is rotated clockwise to move the slide lever 29 to the right by the pin 26a of the dial 26. A distal end 25c of the click spring 25 is fitted in the notch 29e to completely set the P imaging field. In a change from the L imaging field to the P imaging field, the gear 31 is rotated clockwise by the rack 29h of the slide lever 29. The pins 20d and 21d of the blades 20 and 21 move along cam portions 23eA and 23fA of the base plate by cam portions 31cA and 31bA of the gear 31. When the cam 31c is moved in an order of 31cC→31cB→31cA as shown in FIG. 8, the pin 20d of the blade 20 is moved upward from 23eC as the L position during imaging field formation to an upper end position of the cam portion 23eA which serves as the position of P imaging field formation. When the cam 31b is moved in an order of 31bC→31bB→31bA, the pin 21d of the blade 21 is moved downward from the L imaging field position, i.e., 23fC, to a lower end position of the cam portion 23fA which serves as the position of P imaging field formation. However, the blades 20 and 21 cannot be set to predetermined P imaging field positions by moving only the pins 20d and 21d of the blades 20 and 21. For this reason, the gear 28 as the second positioning mechanism is driven to change the positions. When the slide lever 29 is moved to the right, an end face 29i at the end of the rack 29h is engaged with the spring hook 27b of the driven lever 27 to press the spring hook 27b of the driven lever 27 to the right against the spring 33. When the driven lever 27 is moved to the right, the rack 27a of the driven lever 27 is moved to the right, and the gear 28 rotating about the shaft 23g of the base plate 23 is rotated counterclockwise, accordingly. This gear 28 has the pins 28a and 28b formed on the front and rear surfaces thereof and engaged with the elongated hole 20c of the blade 20 and the elongated hole 21c of the blade 21, respectively. The gear 28 has a gear ratio with the rack 27a so that the gear 28 is rotated counterclockwise by just 180°. The radius from the central shaft 23g to the pin 28a is determined such that when the gear 28 is rotated counterclockwise by 180°, the pin 28a is moved upward by the same amount as that obtained when the pin 20d of the blade 20 is moved upward by the cam portion 23e of the base plate 23. The end face 20a of the blade 20 in FIG. 8 upon rotation of the gear 28 is moved upward in a parallell direction by a distance $d_{P1}$ with respect to the position of the L imaging field in FIG. 7. The end face 20b is moved to the right to the same position as the position of the H imaging field formation by a distance $d_{L1}$ in FIG. 7. This also applies to the blade 21. The pin 28b is moved downward by the same descending amount as that obtained when the pin 21d is moved downward by the cam portion 23f. For this reason, at the position of the P imaging field formation in FIG. 8, the end face 21b is moved downward in a parallell direction to the P position by a distance $d_{P2}$ with respect to the position of the L imaging field formation in FIG. 7, and the end face 21a is moved to the left to the same position as in H imaging field formation by $d_{L2}$ in FIG. 7. In this case, since the pin 28b of the gear 28 extends through the rear surface of the base plate 23, the base plate 23 has a semicircular elongated hole 23h to drive the blade 21.

Figure 9:
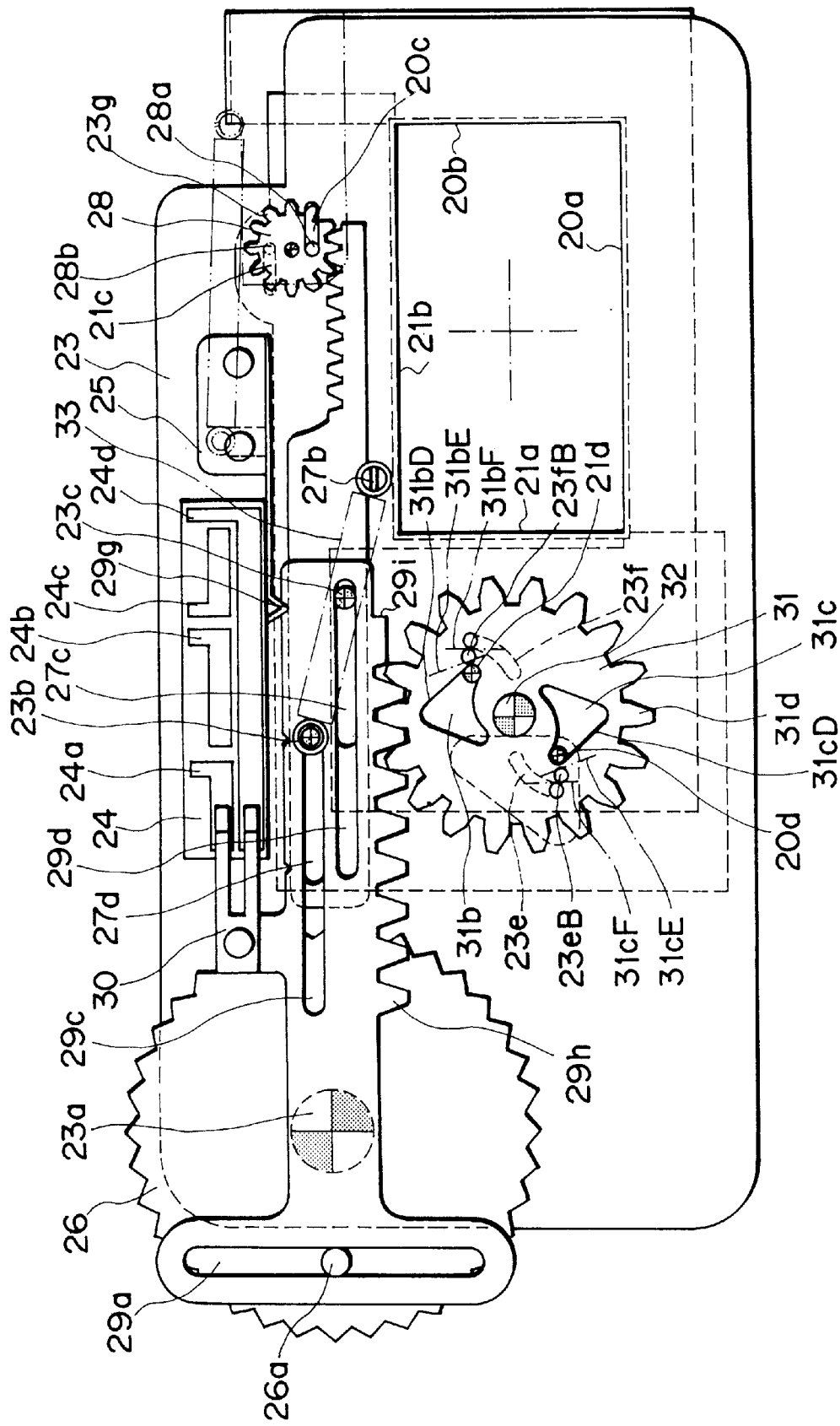
FIG. 9 is a plan view showing the internal structure of the imaging field changing apparatus according to the second embodiment of the present invention.

FIG. 9 shows a state of the H imaging field. When the dial is rotated to fit the click spring 25 in the notch 29g of the slide lever 29, as shown in FIG. 9, the state of the H imaging field formation is completely set. It is important that the state of the L imaging field formation is always temporarily set every time the change is made from the state of the P imaging field formation in FIG. 8 to the state of the H imaging field formation in FIG. 9 and vice versa. A change from FIG. 8 to FIG. 9 will be described below. In the state in FIG. 8, when the dial 26 is rotated clockwise, the pin 26a is also rotated clockwise. When the pin 26a is located immediately below the rotating shaft 23a, the slide lever 29 is moved to the position of the L imaging field formation. When the dial 26 is further rotated clockwise, the slide lever 29 is moved to the left and set to the position shown in FIG. 9. Upon movement of the slide lever 29 to the left, the gear 31 is rotated counterclockwise. The pins 20d and 21d of the blades escape such that the cam surfaces of the gear 31 change in orders of 31cA→31cB→31cC and 31bA→31bB→31bC, respectively. The blades 20 and 21 are brought into contact with the cam portions 23eC and 23fC serving as the positions of L imaging field formation in FIG. 7, respectively. When the dial 26 is further rotated to move the slide lever 29 to the left and rotate the gear 31 counterclockwise. As shown in FIG. 9, the pins 20d and 21d of the blades 20 and 21 are pressed by the cam surfaces 31c and 31b of the gear 31 and set to the H position along the cam portions 23e and 23f of the base plate 23 in orders of 31cF→31cE→31cD and 31bF→31bE→31bD, respectively.

During movement of the slide lever 29 to the left from the state in FIG. 8, the driven lever 27 is moved to the left by the spring 33, the gear 28 is rotated clockwise, and the positioning pins 28a and 28b of the blades 20 and 21 are set in the state shown in FIG. 7. In this case, the slide lever 29 is moved to the left to the position shown in FIG. 9, but the driven lever 29 can be moved to only the states in FIGS. 7 and 8 by the engagement of the elongated holes 27d and 27c of the driven lever 27 and the pins 23b and 23c of the base plate 23. In the state of FIG. 9, the driven lever 27 is stopped at the same position as in the state of FIG. 7, and only the slide lever 29 is moved to the left. In addition, as compared with the state in FIG. 7, the blades 20 and 21 can be further moved to the right and left, respectively, by means of the elongated holes 20c and 21c guided by the pins 28a and 28b of the gear 28.

For this reason, the intermediate state of the L imaging field formation is always set every time the change is made from the state of P imaging field formation in FIG. 8 to the state of H imaging field formation in FIG. 9. When the dial 26 is rotated as described above, a change can be possible in an order of L→P→L→H→L. For example, in an external display of L, H, and P and image recording on a film, as shown in FIGS. 6 to 9, the contact piece 30 is mounted on the slide lever 29, the printed board 24 is fixed to the base plate 23, and patterns 24a, 24b, and 24c and a common pattern 24d for obtaining electrical signals at positions respectively corresponding to the H, L, and P click positions are arranged to achieve the above operation. In this case, when the dial is rotated, the mode changes in an order of H→L→P→L→H. However, the slide lever 29 may be directly slid with a knob.

As has been described above, according to each embodiment, three or more imaging fields are provided, and the P imaging field is set after the L imaging field. In the finder, the upper and lower portions are cut, and the right and left portions are widened to maximally emphasize wideness. The wideness obtained upon printing can be obtained during photography.

The present invention is also applicable to a mechanism for changing a film exposure area for photographic imaging field changing and a finder imaging field changing mechanism.

An example for applying the present invention to a finder imaging field changing is as follows. The imaging field changing mechanism of the present invention is applied to the finder imaging field changing mechanism. However, an exposure area is a constant area, and a photographing itself is always performed at the same imaging field. After photographing, when a photograph is printed, an imaging field frame of the printed photograph is adjusted to correspond to the finder imaging field during photography.

It is also possible to use both the exposure area changing mechanism and the finder imaging field changing mechanism and interlock them.

The imaging fields to be changed are not limited to the normal imaging field, the panorama imaging field, and the high-vision imaging field. The shape and size of imaging fields are not limited to specific ones if a change is made between different imaging fields.

The present invention is also applicable to at least three imaging fields having different sizes although their aspect ratios are equal to each other, in addition to a change among imaging fields having different aspect ratios. In this case, a minimum imaging field is changed to a maximum imaging field, and vice versa.

The present invention is further applicable to optical equipment other than a camera, capable of changing imaging fields.

Any imaging field changing method can be used in addition to electrical changing using ON and OFF operations of an LCD and mechanical changing upon moving a light-shielding member.

What is claimed is:

1. An imaging field changing apparatus comprising:
   an imaging field changing device that changes an imaging field among a first imaging field, a second imaging field, and a third imaging field, such that the first imaging field has an upper portion, a lower portion, a left end portion and a right end portion, the second imaging field is obtained by shielding at least one of the upper portion and the lower portion of the first imaging field such that a vertical length of the second imaging field is shorter than a vertical length of the first imaging field and a lateral length of the second imaging field is the same as a lateral length of the first imaging field, and the third imaging field is obtained by shielding at least one of the right end portion and the left end portion of the first imaging field such that a vertical length of the third imaging field is the same as a vertical length of the first imaging field and a lateral length of the third imaging field is shorter than a lateral length of the first imaging field; and a changing order determining device that causes the imaging field changing device to only change the imaging field from the third imaging field directly to the second imaging field.

2. An imaging field changing apparatus according to claim 1, wherein said changing order determining device only changes the imaging field according to the following imaging field changing operations: (1) changing the first imaging field directly to the third imaging field, (2) changing the third imaging field directly to the second imaging field and (3) changing the second imaging field directly to the first imaging field.

3. An image field changing apparatus according to claim 1, wherein said imaging field changing device includes means for regulating the first imaging field by a standard field frame which is permanently provided on the apparatus.

4. An apparatus according to claim 1, wherein said imaging field changing device includes means for changing a light-shielding state of an optical path for forming an imaging field.

5. An apparatus according to claim 4, wherein said imaging field changing device includes a light-shielding member movable within the optical path.

6. An apparatus according to claim 4, wherein said imaging field changing device includes means for electrically changing a light-shielding state of the optical path.

7. An apparatus according to claim 1, wherein said imaging field changing device includes means for changing a finder imaging field.

8. An apparatus according to claim 1, further comprising external operating means for initiating an imaging field changing operation, and wherein said imaging field changing device performs an imaging field changing operation in accordance with an operational state of said external operating means.

9. An apparatus according to claim 1, further comprising a first member that forms a first portion and includes means for forming a first side which corresponds to at least one side of said at least one of the first, second, and third imaging fields, and means for forming a second side, different from the first side which corresponds to another side of said at least one of the first, second, and third imaging fields.

10. An apparatus according to claim 9, further comprising a second member, different from the first member, that forms a second portion, different from the first portion, wherein at least one of said first and second members shields a transmitted light and includes light shielding means in which a light shielding state can be changed, and said imaging field changing device comprises means for changing the imaging field by changing the light shielding state of the light shielding means.

11. A camera comprising:

an imaging field changing device that changes an imaging field among a first imaging field, a second imaging field, and a third imaging field, such that the first imaging field has an upper portion, a lower portion, a left end portion and a right end portion, the second imaging field is obtained by shielding at least one of the upper portion and the lower portion of the first imaging field such that a vertical length of the second imaging field is shorter than a vertical length of the first imaging field and a lateral length of the second imaging field is the same as a lateral length of the first imaging field, and the third imaging field is obtained by shielding at least one of the right end portions and the left end portion of the first imaging field such that a vertical length of the third imaging field is the same as a vertical length of the first imaging field and a lateral length of the third imaging field is shorter than a lateral length of the first imaging field; and a changing order determining device that causes the imaging field changing device to only change the imaging field from the third imaging field directly to the second imaging field.

12. A camera according to claim 11, wherein said changing order determining device causes said imaging filed changing device only change the imaging field according to the following imaging field changing operations: (1) changing the first imaging field directly to the third imaging field, (2) changing the third imaging field directly to the second imaging field and (3) changing the second imaging field directly to the first imaging field.

13. An optical equipment comprising:

an imaging field changing device that changes an imaging field among a first imaging field, a second imaging field, and a third imaging field, such that the first imaging field has an upper portion, a lower portion, a left end portion and a right end portions, the second imaging field is obtained by shielding at least one of the upper portion and the lower portion of the first imaging field such that a vertical length of the second imaging field is shorter than a vertical length of the first imaging field and a lateral length of the second imaging field is the same as a lateral length of the first imaging field, and the third imaging field is obtained by shielding at least one of the right end portion and the left end portion of the first imaging field such that a vertical length of the third imaging field is the same as a vertical length of the first imaging field and a lateral length of the third imaging field is shorter than a lateral length of the first imaging field; and a changing order determining device that causes the imaging field changing device to only change the imaging field from the third imaging field directly to the second imaging field.

14. An optical equipment according to claim 13, wherein said changing order determining device causes said imaging filed changing device only change the imaging field according to the following imaging field changing operations: (1) changing the first imaging field directly to the third imaging field, (2) changing the third imaging field directly to the second imaging field and (3) changing the second imaging field directly to the first imaging field.

15. An imaging field changing apparatus comprising:

an imaging field changing device that changes an imaging field among at least a first imaging field, a second imaging field, and a third imaging field, each of said first imaging field, said second imaging field and said third imaging field having different aspect ratios defined as a ratio of a vertical length to a lateral length of the respective imaging fields, such that the first imaging field has an upper portion, a lower portion, a left end portion and a right end portion, the second imaging field is obtained by shielding at least one of the upper portion and the lower portion of the first imaging field such that a vertical length of the second imaging field is shorter than a vertical length of the first imaging field and a lateral length of the second imaging field is the same as a lateral length of the first imaging field, and the third imaging field is obtained by shielding at least one of the right end portion and the left end portion of the first imaging field such that a vertical length of the third imaging field is the same as a vertical length of the first imaging field and a lateral length of the third imaging field is shorter than a lateral length of the first imaging field; and a changing order determining device that causes the imaging field changing device to only change the imaging field from the third imaging field directly to the second imaging field.

16. An apparatus according to claim 15, wherein a rate of change in the aspect ratio upon the change between the third imaging field and the second imaging field is larger than a rate of change in the aspect ratio upon the change between the second imaging field and the first imaging field and is also larger than a rate of change in the aspect ratio upon the change between the first imaging field and the third imaging field.

17. A camera comprising:

an imaging field changing device that changes an imaging field among at least a first imaging field, a second imaging field, and a third imaging field, each of said first imaging field, said second imaging field and said third imaging field having different aspect ratios defined as a ratio of a vertical length to a lateral length of the respective imaging fields, such that the first imaging field has an upper portion, a lower portion, a left end portion and right end portion, the second imaging field is obtained by shielding at least one of the upper portion and the lower portion of the first imaging field such that a vertical length of the second imaging field is shorter than a vertical length of the first imaging field and a lateral length of the second imaging field is the same as a lateral length of the first imaging field, and the third imaging field is obtained by shielding at least one of the right end portion and the left end portion of the first imaging field such that a vertical length of the third imaging field is the same as a vertical length of the first imaging field and a lateral length of the third imaging field is shorter than a lateral length of the first imaging field; and a changing order determining device that causes said imaging field changing device to only change the imaging field from the third imaging field directly to the second imaging field.

18. An optical equipment comprising:

an imaging field changing device that changes an imaging field among at least a first imaging field, a second imaging field, and a third imaging field, each of said first imaging field, said second imaging field and said third imaging field having different aspect ratios defined as a ratio of a vertical length to a lateral length of the respective imaging fields, such that the first imaging field has an upper portion, a lower portion, a left end portion and a right end portion, the second imaging field is obtained by shielding at least one of the upper portion and the lower portion of the first imaging field such that a vertical length of the second imaging field is shorter than a vertical length of the first imaging field and a lateral length of the second imaging field is the same as a lateral length of the first imaging field, and the third imaging field is obtained by shielding at least one of the right end portion and the left end portion of the first imaging field such that a vertical length of the third imaging field is the same as a vertical length of the first imaging field and a lateral length of the third imaging field is shorter than a lateral length of the first imaging field; and a changing order determining device that causes said imaging field changing device to only change the imaging field from the third imaging field directly to the second imaging field.

19. An imaging field changing apparatus comprising:

an imaging field changing device that changes an imaging field among a first imaging field, a second imaging field, and a third imaging field, each of which has a different aspect ratio defined as a ratio of a vertical length to a lateral length of an imaging field, such that the first imaging field has an upper portion, a lower portion, a left end portion and a right end portion, the second imaging field is obtained by shielding at least one of the upper portion and the lower portion of the first imaging field such that a vertical length of the second imaging field is shorter than a vertical length of the first imaging field and a lateral length of the second imaging field is the same as a lateral length of the first imaging field, and the third imaging field is obtained by shielding at least one of the right end portion and the left end portion of the first imaging field such that a vertical length of the third imaging field is the same as a vertical length of the first imaging field and a lateral length of the third imaging field is shorter than a lateral length of the first imaging field; and a changing order determining device that causes said imaging field changing device to only change the imaging field from the third imaging field directly to the second imaging field, and wherein a change between imaging fields is effected by varying an open state of an aperture portion through which light for forming an image is passed.

20. An optical equipment comprising:

an imaging field changing device that changes an imaging field among a first imaging field, a second imaging field, and a third imaging field, each of which has a different aspect ratio defined as a ratio of a vertical length to a lateral length of an imaging field, such that the first imaging field has an upper portion, a lower portion, a left portion end and a right end portion, the second imaging field is obtained by shielding at least one of the upper portion and the lower portion of the first imaging field such that a vertical length of the second imaging field is shorter than a vertical length of the first imaging field and a lateral length of the second imaging field is the same as a lateral length of the first imaging field, and the third imaging field is obtained by shielding at least one of the right end portion and the left end portion of the first imaging field such that a vertical length of the third imaging field is the same as a vertical length of the first imaging field and a lateral length of the third imaging field is shorter than a lateral length of the first imaging field; and a changing order determining device that causes said imaging field change device to only change the imaging field from the third imaging field directly to the second imaging field, and wherein a change between imaging fields is effected by varying an open state of an aperture portion through which light for forming an image is passed.

21. A camera comprising:

an imaging field changing device that changes an imaging field among a first imaging field, a second imaging field, and a third imaging field, each of which has a different aspect ratio defined as a ratio of a vertical length to a lateral length of an imaging field, such that the first imaging field has an upper portion, a lower portion, a left end portion and right end portion, the second imaging field is obtained by shielding at least one of the upper portion and the lower portion of the first imaging field such that a vertical length of the second imaging field is shorter than a vertical length of the first imaging field and a lateral length of the second imaging field is the same as a lateral length of the first imaging field, and the third imaging field is obtained by shielding at least one of the right end portion and the left end portion of the first imaging field such that a vertical length of the third imaging field is the same as a vertical length of the first imaging field and a lateral length of the third imaging field is shorter than a lateral length of the first imaging field; and a changing order determining device that causes said imaging field changing device to only change the imaging field from the third imaging field directly to the second imaging field, and wherein a change between imaging fields is effected by varying an open state of an aperture portion through which light for forming an image is passed.

22. An imaging field changing apparatus comprising:

an imaging field changing device that changes an imaging field among a first imaging field, a second imaging field, and a third imaging field, such that the first imaging field has an upper portion, a lower portion, a left end portion and right end portion, the second imaging field is obtained by shielding at least one of the upper portion and the lower portion of the first imaging field such that a vertical length of the second imaging field is shorter than a vertical length of the first imaging field and a lateral length of the second imaging field is the same as a lateral length of the first imaging field, and the third imaging field is obtained by shielding at least one of the right end portion and the left end portion of the first imaging field such that a vertical length of the third imaging field is the same as a vertical length of the first imaging field and a lateral length of the third imaging field is shorter than a lateral length of the first imaging field; and a changing order determining device that causes said imaging field changing device to only change the imaging field from the third imaging field directly to the second imaging field, and wherein a change between imaging fields is effected by varying an open state of an aperture portion through which light for forming an image is passed.

23. An optical equipment comprising:

an imaging field changing device that changes an imaging field among a first imaging field, a second imaging field, and a third imaging field, such that the first imaging field has an upper portion, a lower portion, a left end portion and a right end portion, the second imaging field is obtained by shielding at least one of the upper portion and the lower portion of the first imaging field such that a vertical length of the second imaging field is shorter than a vertical length of the first imaging field and a lateral length of the second imaging field is the same as a lateral length of the first imaging field, and the third imaging field is obtained by shielding at least one of the right end portion and the left end portion of the first imaging field such that a vertical length of the third imaging field is the same as a vertical length of the first imaging field and a lateral length of the third imaging field is shorter than a lateral length of the first imaging field; and a changing order determining device that causes the imaging filed changing device to only change the imaging field from the third imaging field directly to the second imaging field, and wherein a change between imaging fields is effected by varying an open state of an aperture portion through which light for forming an image is passed.

24. A camera comprising:

an imaging field changing device that changes an imaging field among a first imaging field, a second imaging field, and a third imaging field, such that the first imaging field has an upper portion, a lower portion, a left end portion and a right end portion, the second imaging field is obtained by shielding at least one of the upper portion and the lower portion of the first imaging field such that a vertical length of the second imaging field is shorter than a vertical length of the first imaging field and a lateral length of the second imaging field is the same as a lateral length of the first imaging field, and the third imaging field is obtained by shielding at least one of the right end portion and the left end portion of the first imaging field such that a vertical length of the third imaging field is the same as a vertical length of the first imaging field and a lateral length of the third imaging field is shorter than a lateral length of the first imaging field; and a changing order determining device that causes the imaging field changing device to only change the imaging field from the third imaging field directly to the second imaging field, and wherein a change between imaging fields is effected by varying an open state of an aperture portion through which light for forming an image is passed.

\* \* \* \* \*

UNITED STATES PATENT AND TRADEMARK OFFICE
CERTIFICATE OF CORRECTION

PATENT NO. : 5,960,223

DATED : September 28, 1999

INVENTOR(S): MASAKAZU TAKU

Page 1 of 2

It is certified that error appears in the above-identified patent and that said Letters Patent is hereby corrected as shown below:

At [56] References Cited

Insert --FOREIGN PATENT DOCUMENTS
    5-6439 1/1993 Japan--.

Column 3

Line 7, "yes"," should read --YES",--.

Column 8

Line 16, "portions" should read --portion--.
    Line 28, "filed" should read --field--.
    Line 29, "only" should read --to only--.
    Line 40, "portions," should read --portion,--.
    Line 62, "filed" should read --field--.

UNITED STATES PATENT AND TRADEMARK OFFICE
CERTIFICATE OF CORRECTION

PATENT NO. : 5,960,223

DATED : September 28, 1999

INVENTOR(S): MASAKAZU TAKU

It is certified that error appears in the above-identified patent and that said Letters Patent is hereby corrected as shown below:

Column 12

Line 31, "filed" should read --field--.

Signed and Sealed this

Sixth Day of June, 2000

Attest:

Q. TODD DICKINSON

Attesting Officer     Director of Patents and Trademarks